(12) United States Patent
Thomas

(10) Patent No.: US 10,345,002 B2
(45) Date of Patent: Jul. 9, 2019

(54) ADJUSTABLE CONCEALED HEATING AND COOLING SYSTEM

(71) Applicant: Roger Thomas, Brooklyn, NY (US)

(72) Inventor: Roger Thomas, Brooklyn, NY (US)

( * ) Notice: Subject to any disclaimer, the term of this patent is extended or adjusted under 35 U.S.C. 154(b) by 0 days.

(21) Appl. No.: 16/243,294

(22) Filed: Jan. 9, 2019

(65) Prior Publication Data
US 2019/0145632 A1 May 16, 2019

Related U.S. Application Data

(63) Continuation of application No. PCT/US2017/049673, filed on Aug. 31, 2017.

(51) Int. Cl.
*F24D 3/14* (2006.01)
*F24H 3/04* (2006.01)
*F24F 13/20* (2006.01)
*E04B 2/58* (2006.01)
*F28D 21/00* (2006.01)

(52) U.S. Cl.
CPC ............. *F24F 13/20* (2013.01); *F24D 3/145* (2013.01); *F24D 3/148* (2013.01); *F24H 3/0411* (2013.01); *E04B 2/58* (2013.01); *F24F 2221/17* (2013.01); *F28D 2021/0035* (2013.01); *Y02B 30/24* (2013.01)

(58) Field of Classification Search
CPC ... E04B 1/74; E04B 2/562; E04B 2/58; E04B 2/70; F24D 3/14; F24D 3/145; F24D 3/148; F24H 3/0411; Y02B 30/24; E04C 2/521; E04C 2/525; F28D 2021/0035

USPC ..... 52/220.1, 220.3; 219/213; 392/352, 363, 392/371

See application file for complete search history.

(56) References Cited

U.S. PATENT DOCUMENTS

| | | | |
|---|---|---|---|
| 1,698,328 A | 1/1929 | Duffie | |
| 2,654,017 A | 9/1953 | Hicks | |
| 3,157,776 A * | 11/1964 | Sohn | F24H 3/0411 165/122 |
| 3,590,218 A * | 6/1971 | Steiner | F24H 3/0411 126/90 A |
| 3,670,142 A * | 6/1972 | Attridge | F24H 3/0411 165/122 |
| 4,362,922 A * | 12/1982 | Anderson | F24F 7/013 392/368 |
| 4,714,194 A * | 12/1987 | Eckman | F24H 3/0411 165/122 |
| 4,872,399 A | 10/1989 | Chaney | |
| 2005/0168000 A1 | 8/2005 | Anzaldua | |
| 2009/0285567 A1* | 11/2009 | Searle | F24H 3/0417 392/371 |

(Continued)

FOREIGN PATENT DOCUMENTS

EP 1335165 A1 8/2003

*Primary Examiner* — Ryan D Kwiecinski
(74) *Attorney, Agent, or Firm* — Arent Fox LLP

(57) ABSTRACT

A height-adjustable, concealed heating and cooling system that includes a heating and cooling unit and an adjustable frame that enables the (vertical) position of the heating and cooling unit to be modified and to be attached to framing members of a wall or another heating and cooling unit. The heating and cooling unit also includes a housing that is attached to the frame. The housing extends into the wall to define a recess portion through which a heat and/or cooling supply pipe with heat-dissipating fins attached thereto extends.

22 Claims, 4 Drawing Sheets

(56) References Cited

U.S. PATENT DOCUMENTS

2011/0258945 A1* 10/2011 Arbour ................... E04B 2/88
                                                              52/173.3
2017/0248323 A1*  8/2017 Thomas ................. F24D 3/145

* cited by examiner

ADJUSTABLE CONCEALED HEATING AND COOLING SYSTEM

CROSS REFERENCE TO RELATED APPLICATIONS

The present application is a continuation of International application No. PCT/US2017/049673, filed Aug. 31, 2017, the entire content of which is incorporated herein by reference.

BACKGROUND

Providing heat to the inside of a dwelling or other building is important, even legally required in some jurisdictions, so that people can live or work in a comfortable temperature-controlled environment. Heating and cooling systems such as baseboard heaters or steam radiators have been used as a source of heat. However, since these types of systems are installed along the floor and typically against a wall, their use often reduces the useable floor space in the room in which they are installed. This is a particular problem in locations such as urban apartments where useable square footage is in high demand. In addition, these types of systems create tripping hazards, are unsightly, and can be easily damaged since they protrude into the room. Furthermore, such heating and cooling systems are typically not energy efficient due to the heat loss (and subsequent wasted energy) from the space between the wall and, for example, a radiator.

SUMMARY

In light of these problems, the present disclosure is directed towards a height-adjustable, concealed heating and cooling system that, when installed, allows for a larger useable square footage compared to baseboard heaters and steam radiators while still providing adequate heat to the dwelling. The described height-adjustable concealed heating and cooling system further allows the system to be installed concurrently with a framing phase of construction, rather than in the conventional sequence after all walls have been finished.

A height-adjustable, concealed heating and cooling system with a heating and cooling unit and adjustable frame is provided herein. In this system, an adjustable frame is constructed to hold a housing, and for attachment to framing members of a wall. The adjustable frame may have a first side and a second side opposite the first side. The first and second sides are configured to be coupled to framing members of a wall or to another heating and cooling unit. The first and second sides of the frame each include a lower portion configured to slidably receive an upper portion of the side to modify a height of the adjustable frame. The housing may be coupled to the upper portions of the frame and defining a recessed portion within the frame. The heating and cooling system further includes a heat and/or cooling supply pipe or heat return pipe extending through the recessed portion, and the lower portions include a slot configured to receive the heat and/or cooling supply pipe or heat return pipe.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Those of ordinary skill in the art will realize that the following description is illueestrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

DETAILED DESCRIPTION

Figure 1:
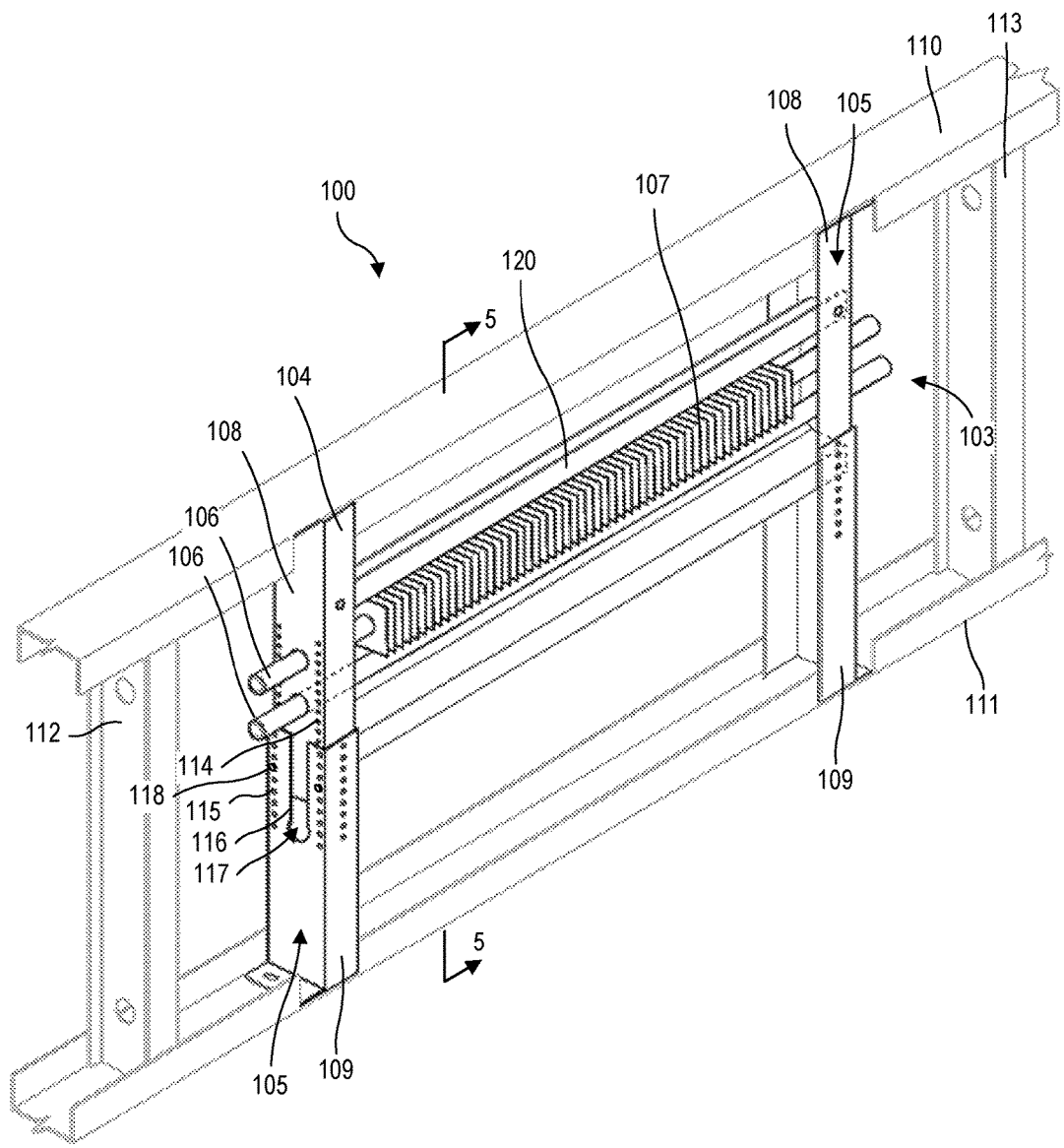
FIG. 1 is a perspective view of a height-adjustable, concealed heating and cooling system in accordance with one embodiment of the present disclosure.

FIG. 1 is a perspective view of a height-adjustable, concealed heating and cooling system 100 in accordance with one embodiment of the present disclosure. In one embodiment, the heating and cooling system 100 may be a hydronic system for providing heating and/or cooling to a building and its rooms. As used herein, a "heating and cooling" unit refers to a unit configured to provide heating and/or cooling, i.e., heating, or cooling, or a combination of both. The heating and cooling system 100 includes at least one heating and cooling unit 103 having an adjustable frame 104 configured to expand or retract to a range of sizes for installation into a building's wall. The adjustable frame 104 includes sides 105 that are configured to be coupled to one or more framing members in the wall or another heating and cooling unit. For sake of explanation, the sides 105 may be referred to as a left side and a right side, but may be generically referred to as a first side and a second side (where the second side is opposite the first side). In the embodiment, the frame 104 may be configured to be coupled to horizontal framing members, such as blocking 110, a bottom plate 111, and other structures (e.g., header, track) of a wall or another heating and cooling unit, and be disposed between vertical framing members, such as wall studs 112, 113, or adjacent another heating and cooling unit. The blocking 110, bottom plate 111, and wall studs 112, 113 can be made of wood, metal, or any other building material that is used in construction.

In one aspect, the heating and cooling unit 103 may be further configured to be stackable with other heating and cooling units 103, i.e., configured to be coupled to and disposed on top of or below another heating and cooling unit 103. The sides 105 may be configured to attachment to the horizontal framing members, and to any adjacent stackable frames 104 of other heating and cooling units 103.

The heating and cooling unit 103 further includes piping 106 for the transport of a liquid heat-transfer medium to be used in heating and/or cooling. In some embodiments, the piping 106 may include a heat and/or cooling supply or return pipe(s) for the transport of, for example, heated water, steam, or cool air from a HVAC system or other appliance to the heating and cooling unit 103. The piping 106 may include a first pipe (i.e., supply) and a second pipe (i.e., return) piping as depicted in the embodiment in FIG. 1, or may have a single pipe. The piping 106 may be disposed through a hole or opening formed through each side 105 of the frame 104. The piping 106 may be preferably made of copper, but can also be made of other materials, such as PEX (crosslinked polyethylene) tubing, CPVC (chlorinated polyvinyl chloride), PP (polypropylene), stainless steel, and aluminum. The heating and cooling unit 103 includes a plurality of heat-dissipating fins 107 coupled to the piping 106 that runs horizontally through the heating and cooling unit 103. The heat-dissipating fins 107 are configured to facilitate heat transfer from the piping 106, and may be made from a thermally conductive material such as steel or aluminum. The shape of the heat-dissipating fins 107 can be square, circular, triangular, or other shapes. In some embodiments, the piping 106 may be a heat supply pipe that branches into two rows of heat-dissipating fins, or may be multiple independent heat supply pipes defining multiple heat zones. In another embodiment, the piping 106 may include a heat supply pipe disposed through one (first) side of the frame 104, having heat-dissipating fins, and that loops back around through opposite (second) side of the frame and out the first side of the frame as a heat return piping. It is understood that frame 104 may be configured to support various piping arrangements of a hydronic-based system for heating and/or cooling, including single-pipe steam systems, two-pipe steam systems, two-pipe direction return systems, two-pipe reverse return systems, three pipe, series loop, and so forth.

As mentioned above, the adjustable frame 104 is configured to expand or contract to a range of sizes for installation into a building's interior wall. In one embodiment, each side 105 of the adjustable frame 104 includes an upper portion 108 and a lower portion 109 that are slidably engaged to each other, thereby allowing the frame 104 to be extended and retracted to various heights and configurations. The upper portion 108 and lower portion 109 can be described as a received portion and a receiving portion. The dimensions of the receiving portion are slightly larger than the dimensions of the received portion such that the receiving portion fits slidingly around the received portion. In general, at least one of the upper portion 108 and the lower portion 109 is configured to slidably receive the other to modify a height of the adjustable frame. In the embodiment shown, the lower portion 109 is the receiving portion that slidingly receives the upper portion 108 (the received portion), which may be coupled to a housing 120. In other embodiments, the upper portion 108 may be the receiving portion that slidingly receives the lower portion 109, the received portion.

In one embodiment, the heating and cooling unit 103 includes a housing 120 coupled to the frame 104 so as to define a recess portion within the frame in which the piping 106 is disposed. As shown in FIG. 1, the piping 106 may extend through the housing 120 and through the sides 105 of the frame 104. The housing 120 may be configured to surround the heat-dissipating fins 107 on all sides except the side facing the room or other space to be heated (for simplicity, simply referred to herein as the room). The housing 120 may be made of steel, aluminum, or other heat conducting material so as to assist with the dissipation of heat described in more detail below. In one embodiment, the housing 120 may be coupled to the upper portions 108, and moves up (or down) as the size of the frame is adjusted. In other embodiments, the housing 120 may be coupled to the lower portions 109.

Adjusting the frame 104 involves extending (or retracting) the upper portions 108 linearly outward from the lower portions 109, which increases (or decreases) the overall height of the frame 104 and changes the vertical position of the heating and cooling unit 103 and housing 120. The frame 104 includes a locking mechanism configured to secure the upper and lower portions in a desired position. In one embodiment, the upper portions 108 may include a plurality of holes 114 formed therein and which can be aligned with at least one of a plurality of holes 115 formed in the lower portions 109. In the embodiment shown in FIG. 1, the holes 114, 115 comprise a front column and rear column of holes formed on the lateral sides of the frame 104. In other embodiments, the holes 114, 115 may be formed on a front side (i.e., room-facing side) of the frame 104. The holes 114, 115 define a plurality of size adjustment settings for the frame 104 or a plurality of positions for the heating and cooling unit 103. Once adjusted to a desired height, the upper portions 108 may be affixed and secured to the lower portions at a given position by one or more fasteners 118 disposed through aligned holes 114, 115. Examples of fasteners 118 may include removable fastening devices such as screws, nuts, bolts, and rivets, as well as other fastening mechanisms, such as clips, clamps, springs, and brackets.

Each lower portion 109 may include a slot 116 configured to receive the piping 106 as the lower portion slidingly receives a corresponding upper portion. That is, as the upper and lower portions overlap, the slot 116 permits the lower portions 109 to accommodate the piping 106 which extends through the frame. In one embodiment, the slot 116 forms an opening in an upper edge of the lower portion 109 and extends longitudinally into the lower portion 109. The slot 116 may have a width equal to or (slightly) larger than the diameter of the piping 106, and a length selected to accommodate the lowest position of the heating and cooling unit 103. In some embodiments, the slot 116 may have a curved distal portion 117 configured to receive and support the piping 106 (having a cylindrical shape) at a lowest configuration of the frame 104.

Figure 2:
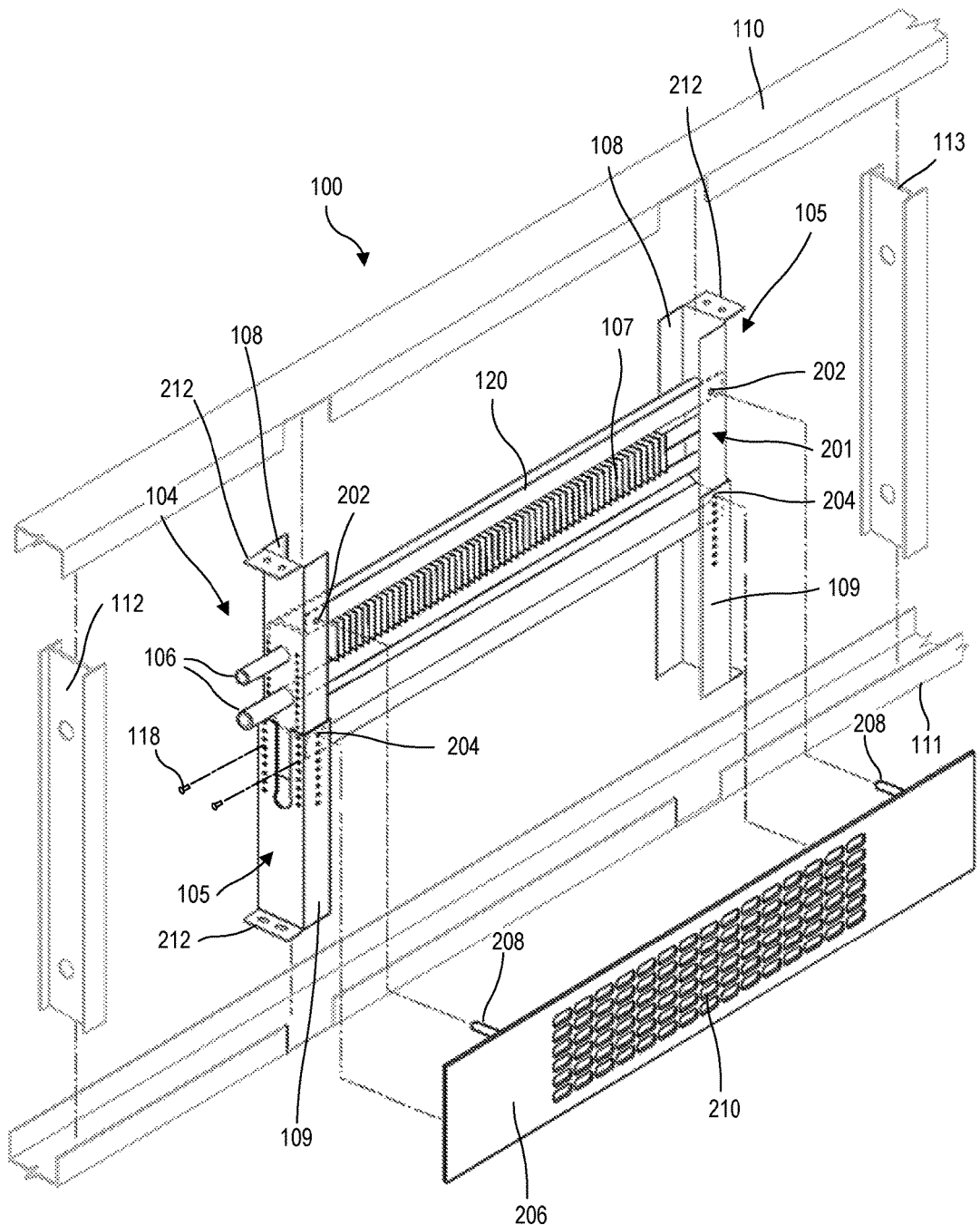
FIG. 2 is an exploded perspective view of one embodiment of a height-adjustable, concealed heating and cooling system, where the heating and cooling system includes a cover.

FIG. 2 is an exploded perspective view of one embodiment of the adjustable, concealed heating and cooling system 100. The heating and cooling unit 103 includes a depth-adjustable cover 206 removably coupled to a room-facing side 201 of the frame 104. In some embodiments, the depth-adjustable cover 206 may include a plurality of plugs 208 extending orthogonally from the cover. The depth-adjustable cover 206 may be removable to allow for cleaning and/or replacement of the cover 206 due to damage or aesthetic reasons. For example, depending on the stylistics preferences, the cover 206 can be changed so as to match the decor or aesthetic style of the person residing in the dwelling. In some embodiments, the depth-adjustable cover 206 may include a grating 210, such as perforations or other openings, formed therein for allowing air to permeate through the depth-adjustable cover 206. The depth-adjustable cover 206 may be made of steel, aluminum, or other heat-conducting material so as to assist with the dissipation of heat, or can be made of non-heat conducting material such as wood or plastic.

The frame 104 may include a plurality of mounting holes 202 formed on the room-facing side 201 of the upper portions 108 of the frame, and mounting holes 204 formed on the room-facing side 201 of the lower portions 109 of the frame. The mounting holes 202, 204 are configured to accept the plugs 208 (or other fastening devices) of the depth-adjustable cover 206 to secure the depth-adjustable cover 206 to the frame 104. In one embodiment, the mounting holes 204 formed in the lower portions 109 may be a column of holes, which have a spacing that substantially matches the spacing of the holes 115. In this way, there will be bottom mounting holes 204 available for receiving the corresponding bottom plugs 208 of the depth-adjustable cover 206, regardless of the height configuration of the frame 104.

In some embodiments, the plugs 208 are configured to secure the depth-adjustable cover 206 to the frame 104 in one of multiple positions. For example, the plugs 208 may have a plurality of keyed steps formed on a bottom side of the plug, which are configured to rest on a bottom lip of the mounting holes 202, 204, wherein each keyed step defines a different depth configuration for the cover 206. In another embodiment, the plugs 208 may be threaded screws and extenders configured to maintain a spaced-apart relation between the depth-adjustable cover 206 and the room-facing side of the frame 104, which may be modified by adjusting the threaded screws.

In one embodiment, the upper portions 108 and lower portions 109 include flanges 212 for attachment to one or more horizontal framing members (e.g., blocking 110, bottom plate 111) or coupled to another heating and cooling unit 103. As shown, the flanges 212 may extend perpendicularly from the sides 105 and parallel to the horizontal framing members. Each flange 212 is disposed against the inner surface of the horizontal framing members when the frame 104 is mounted inside the wall. Each flange 212 may include one or more mounting holes formed therein to facilitate coupling the frame 104 to the framing members, for example using fasteners. In some embodiments, each of portion 108, 109 and a corresponding flange 212 may be fabricated from a single piece of material.

Figure 3:
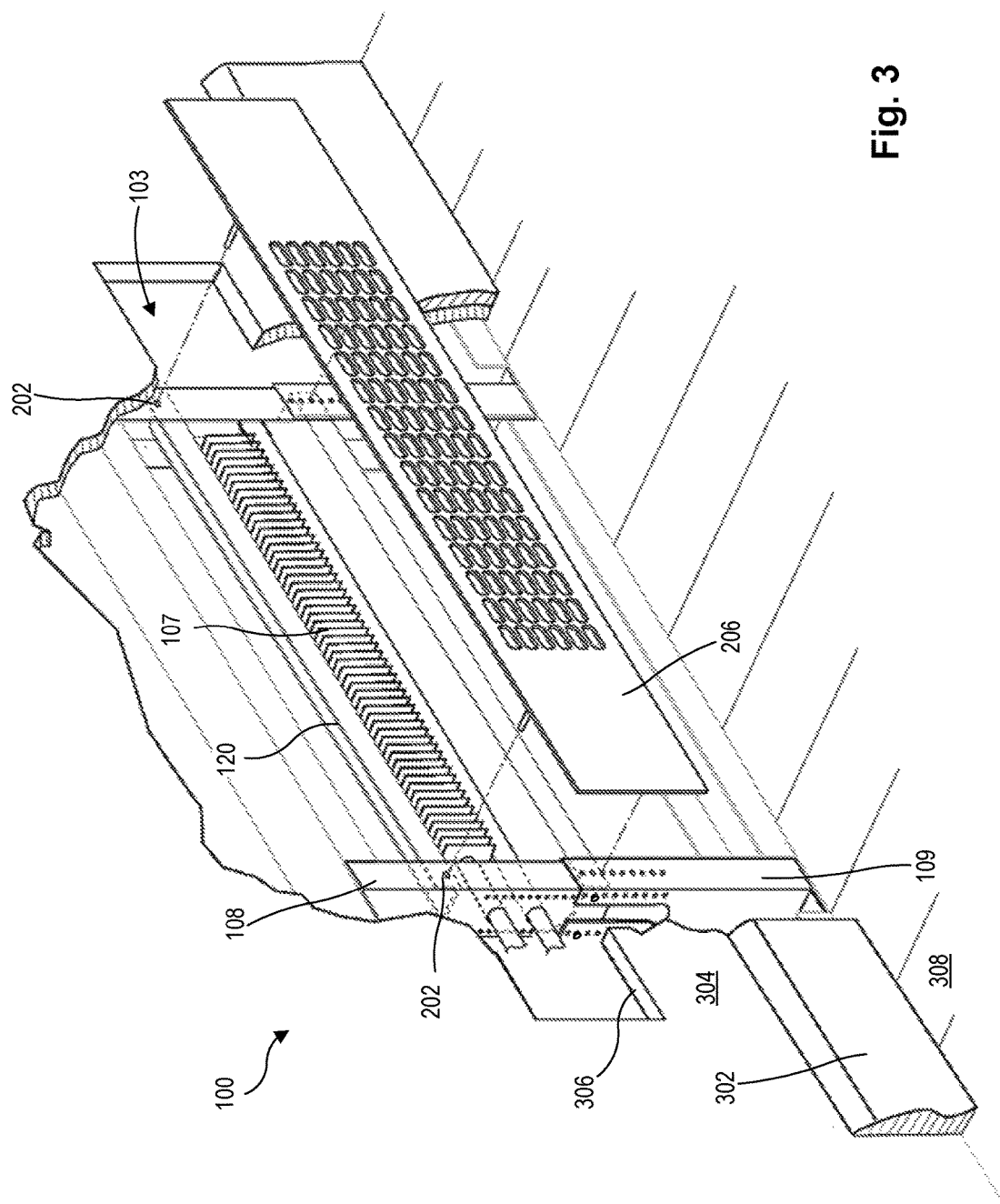
FIG. 3 is a perspective view of one embodiment of a height-adjustable concealed heating and cooling system, where the heating and cooling system is within a finished wall.

FIG. 3 is a perspective view of one embodiment of a height-adjustable concealed heating and cooling system 100, where the heating and cooling system 100 is installed within a finished wall 304. The heating and cooling system 100 is configured to be installed and recessed within an exterior or interior wall 304 of the dwelling.

Figure 4:
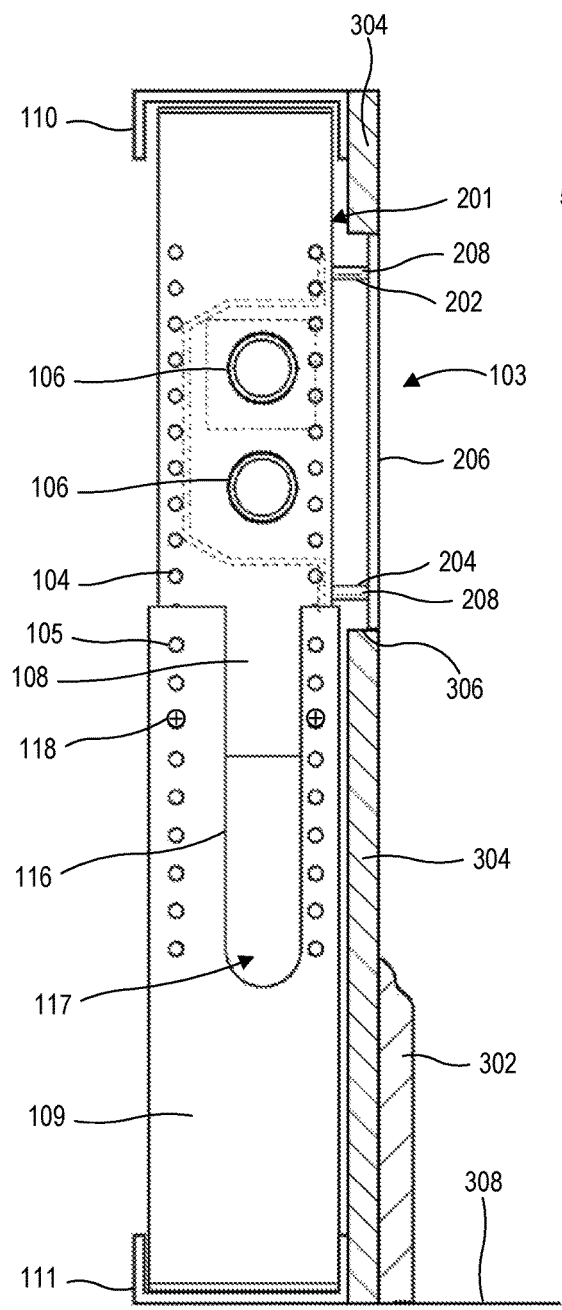
FIG. 4 is a side view of the height-adjustable concealed heating and cooling system of FIG. 1.

As shown in FIG. 3, and additionally in FIG. 4, the heating and cooling unit 103 can be installed at a location above a baseboard trim molding 302 of the room in which the unit is located. This provided the advantage of allowing the room to be designed with a finish and uniform overall appearance without interfering with the decorative moldings as would otherwise occur with conventional baseboard heaters. Also, since the heating and cooling system 100 is disposed recessed into the wall 304, the remaining of the wall 304 around the heating and cooling unit 103 can be easily finished with standard sheetrock. Moreover, the heating and cooling system 100 can be installed at various heights to not only provide heat, but create an overall decorative design. As shown, the heating and cooling system 100 is not disposed on a floor 308 of the room, and therefore advantageously does not reduce the usable floor space in the room in which the heating and cooling system 100 is installed.

During a renovation in which the wall 304 is already finished, installation of the heating and cooling system 100 may include creating an opening 306 in the wall 304 for the insertion of the adjustable frame 104. Prior to insertion, the adjustable frame 104 may be modified into a collapsed configuration (i.e., fully retracted) such that the upper and lower portions 108, 109 substantially overlap and the heating and cooling unit 103 is disposed in its lowest position. The opening 306 may have a size and shape configured to accommodate the adjustable frame 104 in this collapsed configuration. After insertion, the adjustable frame 104 may be extended vertically into a desired configuration (i.e., height) such that the flanges 212 of the sides 105 are disposed against and then coupled to the horizontal framing members. The depth-adjustable cover 206 may be selected to have a size and shape substantially similar to the size and shape of the opening 306 such that the depth-adjustable cover 206 is disposed substantially flush with the wall 304 (i.e., sheetrock of the wall) when the depth-adjustable cover is secured to the frame 104, or can be sized to larger than the opening so as to completely cover the opening. In some embodiments, the heating and cooling system 100 may include additional cover(s), which may also be depth-adjustable or non-depth-adjustable.

In one embodiment, the adjustable nature of the frame 104 advantageously enables the heating and cooling system 100 and components of the heating and cooling system (e.g., piping, boiler) to be installed in the building during a framing phase of construction for the building, and need not wait until all walls are done. For example, during installation, the frame 104 may be initially coupled to just the bottom plate 111 of a floor, leaving the upper portion unattached. Then, after the framing phase is complete, the frame 104 may be adjusted to extend to a final position depending on the final framing erected around the heating and cooling system 100, and be coupled to another framing member. In another example, the heading and track of the wall may be installed, and then the heating and cooling unit 103 is installed and turned on while the rest of the framing is completed.

With conventional heating and cooling systems, the framing phase (in which the walls, floor systems, and roof systems are installed) is typically completed along with a rough-in of the heating and other mechanical systems, and then the walls and floors, etc., are finished. Thereafter, the roughed-in heating and other mechanical systems are completed. In contrast, a contractor tasked with construction of a building may install the heating and cooling system 100 having an adjustable frame 104 concurrently with framing of the building, complete the inspections for the heating and cooling system for compliance with building codes, and then turn on the heating and cooling system 100 to provide heat for construction workers during construction. This enables the construction of the building framing to continue even during the winter (when construction is typically slower or limited), thereby reducing construction time and costs.

Figure 5:
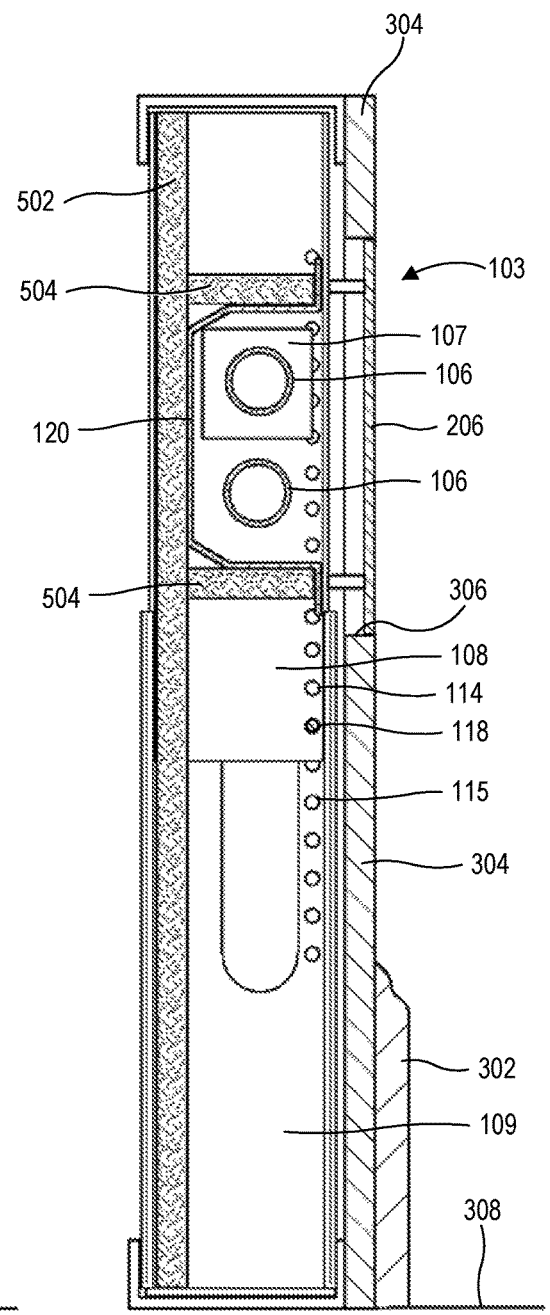
FIG. 5 is a sectional view of one embodiment of the height-adjustable, concealed heating and cooling system taken along section line 5-5 of FIG. 1.

As can be seen in FIG. 5 (which is a sectional view taken along section line 5-5 of FIG. 1), the housing 120 defines a space between the housing 120 and the inside of the wall 304 within which the heating and cooling unit 103 is installed. In some embodiments, particularly embodiments in which the wall 304 is an exterior wall, an insulating material may be disposed within the adjustable frame 104. The insulating material may include a portion of insulating material 502 disposed between the back inside of the wall 304 and the heating and cooling unit 103 in a vertical orientation. The insulating material may also include a portion of insulating material 504 disposed above and below the housing 120 and oriented horizontally.

It should be noted that while FIGS. 1-5 show the heating and cooling unit 103 configured and installed such that the plurality of heat-dissipating fins 107 and portion of the piping 106 to which the heat-dissipating fins 107 are attached are oriented in a horizontal direction and the adjustable frame 104 extends in a vertical direction, it is possible to install the heating and cooling unit 103 such that the plurality of heat-dissipating fins 107 and portion of the piping 106 are oriented in a vertical direction and the adjustable frame 104 extends (and retracts) in a horizontal direction.

What is claimed is:

1. A heating unit comprising:
an adjustable frame having a first side and a second side opposite the first side, the first and second sides configured to be coupled to framing members of a wall, wherein the first and second sides of the adjustable frame each include a lower portion configured to slidably receive an upper portion of the side to modify a height of the adjustable frame;
a housing coupled to the upper portions of the adjustable frame and defining a recessed portion within the adjustable frame; and
piping extending through the recessed portion, wherein the lower portions include a slot configured to receive the piping,
wherein the first side of the adjustable frame comprises a first plurality of holes formed in the upper portion and configured to align with at least one of a second plurality of holes formed in the lower portion.

2. The heating unit of claim 1, further comprising:
a fastener disposed within at least one of the first plurality of holes and at least one of the second plurality of holes to secure the upper portion to the lower portion.

3. The heating unit of claim 1, wherein the slot extends longitudinally from an upper edge of the lower portion, wherein the slot has a width equal to or greater than a diameter of the piping.

4. The heating unit of claim 1, further comprising a depth-adjustable cover removably coupled to the adjustable frame.

5. The heating unit of claim 1, further comprising a plurality of heat-dissipating fins coupled to the piping.

6. The heating unit of claim 1, wherein the piping comprises a heat supply pipe and a return pipe.

7. A heating unit comprising:
an adjustable frame having a first side and a second side opposite the first side, the first and second sides configured to be coupled to framing members of a wall, wherein the first and second sides of the adjustable frame each include a lower portion configured to slidably receive an upper portion of the side to modify a height of the adjustable frame;
a housing coupled to the upper portions of the adjustable frame and defining a recessed portion within the adjustable frame; and
piping extending through the recessed portion, wherein the lower portions include a slot configured to receive the piping,
wherein the first and second sides include one or more flanges configured to be coupled to horizontal framing members of the wall.

8. The heating unit of claim 7, further comprising a depth-adjustable cover removably coupled to the adjustable frame.

9. The heating unit of claim 7, further comprising a plurality of heat-dissipating fins coupled to the piping.

10. The heating unit of claim 7, wherein the piping comprises a heat supply pipe and a return pipe.

11. An adjustable frame for a heating system, comprising:
a housing defining a recessed portion for a pipe; and
a first side and a second side opposite the first side, wherein the first and second sides are configured to be coupled to framing members of a wall, wherein the first and second sides of the adjustable frame each include:
an upper portion coupled to the housing, and
a lower portion configured to slidably receive the upper portion to modify a height of the adjustable frame, wherein the lower portion includes a slot configured to receive the pipe,
wherein the first side of the adjustable frame comprises a first plurality of holes formed in the upper portion and configured to align with at least one of a second plurality of holes formed in the lower portion.

12. The adjustable frame of claim 11, further comprising:
a fastener disposed within at least one of the first plurality of holes and at least one of the second plurality of holes to secure the upper portion to the lower portion.

13. The adjustable frame of claim 11, wherein the slot extends longitudinally from an upper edge of the lower portion, wherein the slot has a width equal to or greater than a diameter of the pipe.

14. The adjustable frame of claim 11, further comprising a depth-adjustable cover removably coupled to the adjustable frame.

15. The adjustable frame of claim 11, wherein the pipe comprises a supply pipe and a return pipe.

16. An adjustable frame for a heating system, comprising:
a housing defining a recessed portion for a pipe; and
a first side and a second side opposite the first side, wherein the first and second sides are configured to be coupled to framing members of a wall, wherein the first and second sides of the adjustable frame each include:
an upper portion coupled to the housing, and
a lower portion configured to slidably receive the upper portion to modify a height of the adjustable frame, wherein the lower portion includes a slot configured to receive the pipe,
wherein the first and second sides include one or more flanges configured to be coupled to horizontal framing members of the wall or to another adjustable frame of another heating system.

17. The adjustable frame of claim 16, further comprising a depth-adjustable cover removably coupled to the adjustable frame.

18. The adjustable frame of claim 16, wherein the pipe comprises a supply pipe and a return pipe.

19. A heating and cooling unit, comprising:
a height-adjustable frame having an upper portion and a lower portion, wherein at least one of the upper and lower portions is configured to slidably receive the other to modify a height of the adjustable frame;
a housing coupled to the upper portion of the adjustable frame and defining a recessed portion within the adjustable frame; and
a pipe configured for transport of a liquid heat-transfer medium and extending through the recessed portion, wherein the lower portion includes a slot configured to receive the pipe, wherein the upper portion includes a first plurality of holes formed therein and configured to align with at least one of a second plurality of holes formed in the lower portion.

20. The heating and cooling unit of claim 19, further comprising:
a fastener disposed within at least one of the first plurality of holes and at least one of the second plurality of holes to secure the upper portion to the lower portion.

21. The heating and cooling unit of claim 19, wherein the slot extends longitudinally from an upper edge of the lower portion, wherein the slot has a width equal to or greater than a diameter of the pipe.

22. The heating and cooling unit of claim 19, further comprising a depth-adjustable cover removably coupled to the adjustable frame.

* * * * *